United States Patent
Hung (10) Patent No.: US 9,442,802 B2
(45) Date of Patent: Sep. 13, 2016

(54) DATA ACCESS METHODS AND STORAGE SUBSYSTEMS THEREOF

(75) Inventor: Ching-Hai Hung, Taipei Hsien (TW)

(73) Assignee: INFORTREND TECHNOLOGY, INC., Taipei Hsien (TW)

(*) Notice: Subject to any disclaimer, the term of this patent is extended or adjusted under 35 U.S.C. 154(b) by 408 days.

(21) Appl. No.: 11/552,631

(22) Filed: Oct. 25, 2006

(65) Prior Publication Data

US 2007/0115731 A1   May 24, 2007

Related U.S. Application Data

(60) Provisional application No. 60/597,275, filed on Nov. 21, 2005.

(51) Int. Cl.
*G06F 12/00* (2006.01)
*G06F 11/10* (2006.01)
*G06F 13/00* (2006.01)
*G06F 13/28* (2006.01)

(52) U.S. Cl.
CPC ....... *G06F 11/1088* (2013.01); *G06F 11/1076* (2013.01)

(58) Field of Classification Search
CPC .................. G06F 11/1088; G06F 11/1076
USPC .................... 711/113, 114, 162; 714/770
See application file for complete search history.

(56) References Cited

U.S. PATENT DOCUMENTS

| 4,864,291 | A | * | 9/1989 | Korpi | 710/305 |
| 5,522,031 | A | * | 5/1996 | Ellis et al. | 714/6.22 |
| 5,758,057 | A | * | 5/1998 | Baba et al. | 714/6.32 |
| 6,023,780 | A | * | 2/2000 | Iwatani | 714/770 |
| 6,321,345 | B1 | * | 11/2001 | Mann et al. | 714/6.22 |
| 2003/0070042 | A1 | * | 4/2003 | Byrd et al. | 711/114 |
| 2003/0105921 | A1 | * | 6/2003 | Tomita | 711/114 |
| 2003/0212858 | A1 | * | 11/2003 | Apperley et al. | 711/114 |
| 2004/0190183 | A1 | * | 9/2004 | Tamai et al. | 360/69 |
| 2005/0152110 | A1 | * | 7/2005 | Chen | 361/685 |

FOREIGN PATENT DOCUMENTS

| JP | 08171463 | 7/1996 |
| JP | 09237165 | 9/1997 |
| WO | WO 0052802 | 9/2000 |

OTHER PUBLICATIONS

UK Office Action mailed Feb. 13, 2007.

* cited by examiner

*Primary Examiner* — Mark Giardino, Jr.
(74) *Attorney, Agent, or Firm* — McClure, Qualey & Rodack, LLP (57) ABSTRACT

Data access methods and storage subsystems thereof for reading data from storage devices in a redundant array of independent disks (RAID) system are provided. After a controller receives a read request, the target data that the controller is about to read and the sub-stripe(s) where the target data is located are determined according to the logical address block information in the read request. The controller simultaneously issues a plurality of I/O requests to all storage devices in order to read the target data and the related data distributed on the same sub-stripe(s) at the same time. If there is any target data without responses for a certain time, it is able to use the related data, which is already responded to the controller, to generate the redundant data identical to the target data for responding the read request as soon as possible so as to reduce unnecessary waiting time.

22 Claims, 8 Drawing Sheets

DATA ACCESS METHODS AND STORAGE SUBSYSTEMS THEREOF

CROSS REFERENCE TO RELATED APPLICATIONS

This application claims priority to provisional patent applications Ser. No. 60/597,275, filed Nov. 21, 2005, and entitled "Data Access Methods And Storage Subsystems Thereof", which is incorporated herein by reference.

BACKGROUND OF THE INVENTION

1. Field of the Invention

The invention relates to data access methods and storage subsystems thereof. In particular, the invention relates to data access methods and storage subsystems without waiting a read timeout.

2. Description of the Related Art

A redundant array of independent disks (RAID) is a disk subsystem comprising a plurality of hard disks and a disk controller for improving access efficiency, providing fault-tolerance ability, or both. RAID systems improve access efficiency by using disk striping technology storing data by bytes or groups of bytes across multiple disks respectively, so that data read/write I/O requests are able to be simultaneously performed in multiple disks in parallel. It is also able to provide fault-tolerance ability by using mirroring technology and/or disk striping with parity technology. Mirroring technology stores the same data in two disks in which one acts as a backup disk. About disk striping with parity technology, for example, a RAID system with two user disks and one parity disk is able to use XOR operations to calculate the user data of the two user disks and then to store the result (i.e. the parity data) in the parity disk. When one of the data disks malfunctions, loses data, or has no response due to other reasons, the disk controller will automatically use the data stored in the other two normal disks and associated with the data to be read, for example, the relevant data located on the same stripe with the data to be read, to generate or rebuild the redundant data identical to the to-be-read data.

In conventional data access methods, after a read request is issued to a target disk drive, it needs to wait for a period until a request timeout occurs, and the redundant data is then generated to recover lost data for responding the read request. However, if the target disk drive does not immediately respond because of media errors or other factors, the conventional methods still need to wait for a period until the read request is timed out before proceeding to the process of reading the associated data to generate the redundant data. It will induce unnecessary waiting time. Thus, a more efficient data access method, control device, and system for reducing unnecessary system waiting time are needed.

BRIEF SUMMARY OF THE INVENTION

The objective of the invention is to provide a data access method and a storage subsystem thereof for reducing unnecessary system waiting time.

According to one feature of the invention, a data access method performed by a controller for reading data from a plurality of storage devices is provided. The data access method comprises steps of: receiving a read request that contains information of reading data from a logical address block; determining a target sub-stripe where at least one target data is located according to the logical address block, the target sub-stripe comprising at least one user data sub-block and at least one parity data sub-block; issuing a plurality of I/O requests to the plurality of storage devices in order to read data stored in the at least one user data sub-block and the at least one parity data sub-block, the plurality of I/O requests comprising at least one first I/O request for reading the target data and at least one second I/O request for reading at least one other related data; and performing a determination procedure comprising a first determination, determining whether the target data has been successfully read and responded, if not, stepping into a second determination, determining whether or not said other related data which has been read and responded is sufficient to do the calculation to generate redundant data identical to the target data, and if the second determination result is yes, generating the redundant data.

According to another feature of the invention, a storage subsystem is provided. The subsystem comprises a storage unit comprising a plurality of storage devices, and a controller coupled to the storage unit for receiving a read request. The read request contains information of reading data from a logical address block. The controller determines a target sub-stripe where at least one target data is located according to the logical address block. The target sub-stripe comprises at least one user data sub-block and at least one parity data sub-block. The controller issues a plurality of I/O requests to the plurality of storage devices for reading data stored in the at least one user data sub-block and the at least one parity data sub-block. The plurality of I/O requests comprise at least one first I/O request for reading the target data and at least one second I/O request for reading at least one other related data. The controller performs a determination procedure comprising a first determination, determining whether the target data has been successfully read and responded, if not, stepping into a second determination, determining whether or not said other related data which has been read and responded is sufficient to do the calculation to generate redundant data identical to the target data, and if the second determination result is yes, generating the redundant data.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

Figure 1:
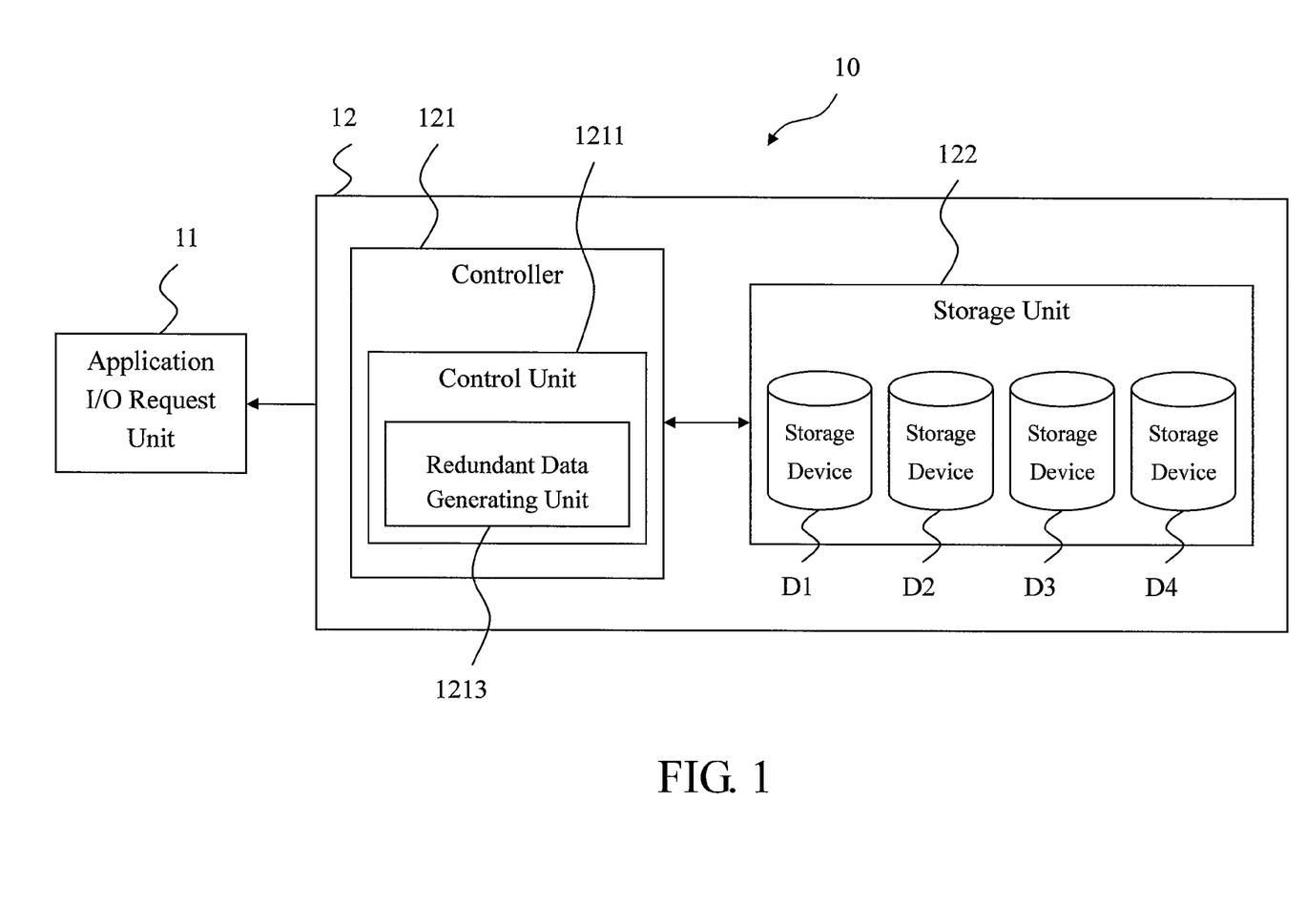
FIG. 1 shows the system structure of the data access system according to an embodiment of the invention.

FIG. 1 shows the system structure of a data access system 10 according to an embodiment of the invention, comprising an application I/O request unit 11 and a storage subsystem 12. The application I/O request unit 11 can be a network computer, a mini computer, a mainframe computer, a laptop computer or any other electronic device needing read data from the storage subsystem 12, such as a cell phone, a personal digital assistant (PDA), a digital recording device, a digital music player, etc. The storage subsystem 12 comprises a controller 121 and a storage unit 122. The controller 121 comprises a control unit 1211, which comprises a redundant data generating unit 1213. The storage unit 122 comprises a plurality of storage devices. Although there are four storage devices D1, D2, D3 and D4 depicted in FIG. 1, it is just an example for the embodiment and does not constitute a limitation to the invention. One of the storage devices (D1, D2, D3 and D4) can be a tape drive, a disk drive, a memory drive, an optical storage drive, or a sector of a disk drive corresponding to a single head, or other equivalent storage device.

The redundant data generating unit 1213 of the control unit 1211 can generate (rebuild) redundant data identical to the to-be-read data. In an embodiment of the invention, which takes RAID 5 as an example, the redundant data generating unit 1213 uses XOR operations to calculate the redundant data. In other embodiments, the redundant data generating unit 1213 may use other means or methods to generate the redundant data identical to the to-be-read data. Moreover, the redundant data generating unit 1213 may be designed to be placed outside the control unit 1211 owing to some practical demands. In addition, in some other embodiments, the redundant data generating unit 1213 may be replaced by other equivalent module to generate the redundant data identical to the to-be-read data. In some embodiments, the redundant data can be obtained by reading backup data. In this case, the redundant data generating unit 1213 or its equivalent modules may not be needed in the subsystem.

When the application I/O request unit 11 is a stand-alone electronic device, it can use a storage area network (SAN), a local area network (LAN), a serial ATA (SATA) interface, a fibre channel (FC) interface, a small computer system interface (SCSI), or a PCI express interface to communicate with the storage subsystem 12. In addition, when the application I/O request unit 11 is a specific integrated circuit (IC) or other equivalent device able to send out I/O read requests, it can send read requests to the controller 121 according to commands (or requests) from other devices for reading data in the storage unit 122 via the controller 121.

The controller 121 and the storage unit 122 of the storage subsystem 12 can be contained in a single enclosure or separately put in different ones. In a preferred condition, the controller 121 can use a fibre channel (FC), a small computer system interface (SCSI), a serial-attached SCSI (SAS) interface, a serial ATA (SATA) interface, or a parallel ATA (PATA or IDE) interface to communicate with the storage unit 122. The storage devices (D1, D2, D3 and D4) in the storage units 122 can be various types of disk drives, such as FC, SAS, SCSI, SATA, PATA, etc. The controller 121 can be a redundant array of independent disk controller (RAID controller) or a controller able to generate redundant data in a storage system. The RAID technology generally includes RAID level 1 to level 6 or the combinations thereof.

Figure 2:
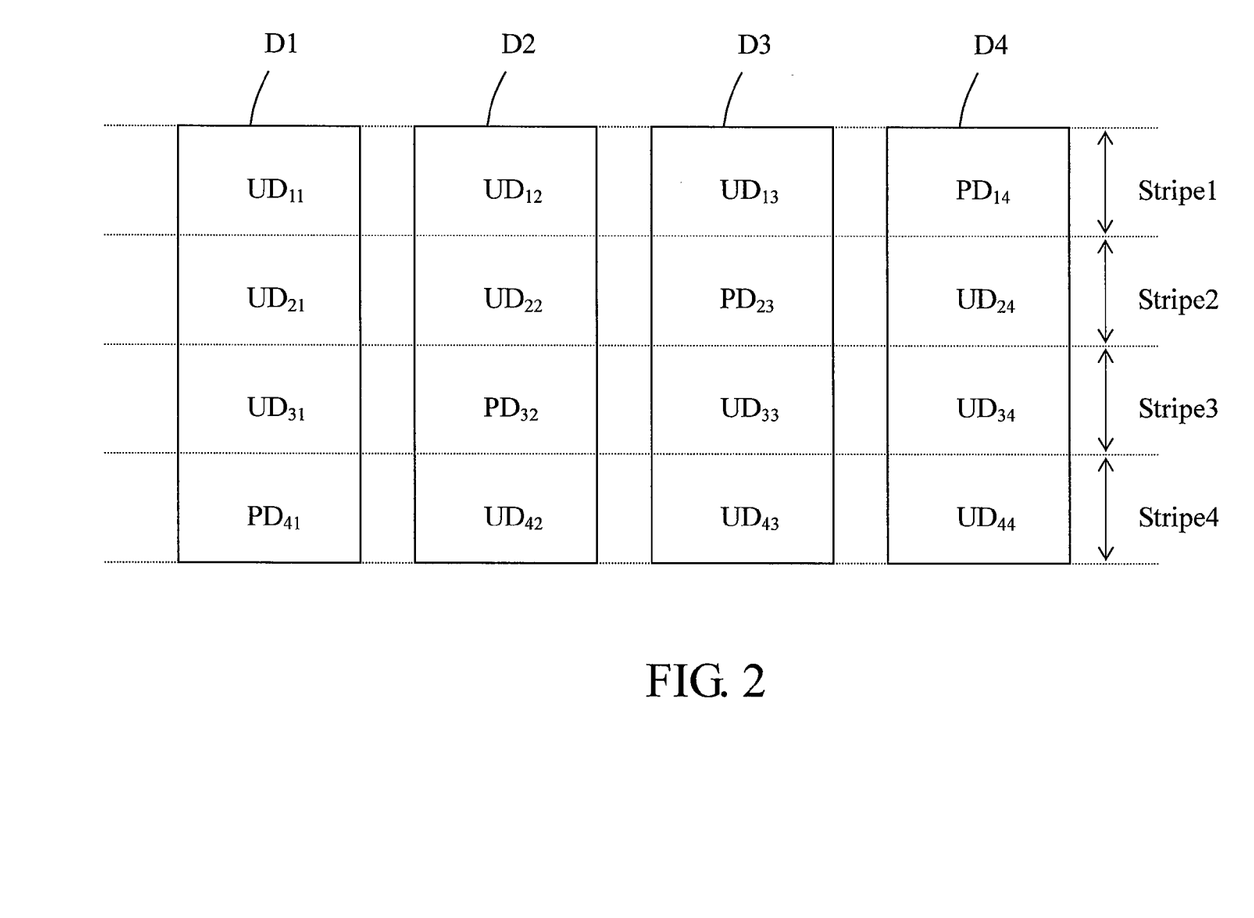
FIG. 2 shows the schematic view of storing space of the storage devices according to an embodiment of the invention.

FIG. 2 shows the schematic view of storing space of the storage devices according to an embodiment of the invention. Each storage device is divided into a plurality of data blocks. From a viewpoint of fault tolerance, the data blocks are classified into two types of user data blocks and parity data blocks. Wherein, in an embodiment utilizing RAID level 1, the parity data blocks are the data blocks backuping data using a mirroring technique. The user data blocks store normal user data. The parity data blocks store one redundant parity data set (or more then one parity data set, depending on the RAID types) for reversely calculating the user data when the fault tolerance demand appears. Taking FIG. 2 as an example, the storage device D1 comprises user data blocks $UD_{11}$, $UD_{21}$, and $UD_{31}$ and a parity data block $PD_{41}$; the storage device D2 comprises user data blocks $UD_{12}$, $UD_{22}$, and $UD_{42}$ and a parity data block $PD_{32}$; the storage device D3 comprises user data blocks $UD_{13}$, $UD_{33}$, and $UD_{43}$ and a parity data block $PD_{23}$; and, the storage device D4 comprises user data blocks $UD_{24}$, $UD_{34}$, and $UD_{44}$ and a parity data block $PD_{14}$. The user data blocks and the parity data block separately locating at different storage devices but corresponding places form a stripe. The data stored in the parity data blocks are the XOR operation results by calculating the data in the corresponding user data blocks. Thus, as shown in FIG. 2, the stripe 1 comprises user data blocks $UD_{11}$, $UD_{12}$ and $UD_{13}$ and a parity data block $PD_{14}$, and the data in the parity data block $PD_{14}$ is the XOR operation result by calculating data in the user data blocks $UD_{11}$, $UD_{12}$ and $UD_{13}$. Similarly, the stripe 2 comprises user data blocks $UD_{21}$, $UD_{22}$ and $UD_{24}$ and a parity data block $PD_{23}$, and the data in the parity data block $PD_{23}$ is the XOR operation result by calculating data in the user data blocks $UD_{21}$, $UD_{22}$ and $UD_{24}$; the stripe 3 comprises user data blocks $UD_{31}$, $UD_{33}$ and $UD_{34}$ and a parity data block $PD_{32}$, and the data in the parity data block $PD_{32}$ is the XOR operation result by calculating data in the user data blocks $UD_{31}$, $UD_{33}$ and $UD_{34}$; the stripe 4 comprises user data blocks $UD_{42}$, $UD_{43}$ and $UD_{44}$ and a parity data block $PD_{41}$, and the data in the parity data block $PD_{41}$ is the XOR operation result by calculating data in the user data blocks $UD_{42}$, $UD_{43}$ and $UD_{44}$. It should be apparent to those skilled in the art that techniques for calculating data stored in user data blocks include not only XOR operations but also a variety of parity operations or similar operations only if the following rule exists: the data in any data block can be obtained by calculating the data in the corresponding data blocks of the same stripe.

Before further describing the embodiment of the invention, some terms are defined beforehand as follows:

1. data read requests: being sent from the application I/O request unit 11 to the controller 121, comprising information of data of a logical address block.
2. I/O requests: being sent from the controller 121 to the storage devices D1, D2, D3 and D4, including information of data of a logical address block, and able to be further classified into two types of a first I/O request and a second I/O request. The first I/O request is issued for the data requested by the data read request. The second I/O request is issued for the data stored in other data blocks (including the user data block(s) and the parity data block(s)) of the same stripe containing the data requested by the data read request. For example, with reference to FIG. 2, if the data requested by the data read request is stored in the user data block $UD_{11}$ of the storage device D1 and the user data block $UD_{12}$ of the storage device D2 after analyzing the data read request, the I/O requests issued from the controller 121 to the storage devices D1 and D2 are the first I/O requests and the I/O requests issued from the controller 121 to storage devices D3 and D4 for reading data stored in data blocks $UD_{13}$ and $PD_{14}$ are the second I/O requests.

Figure 3:
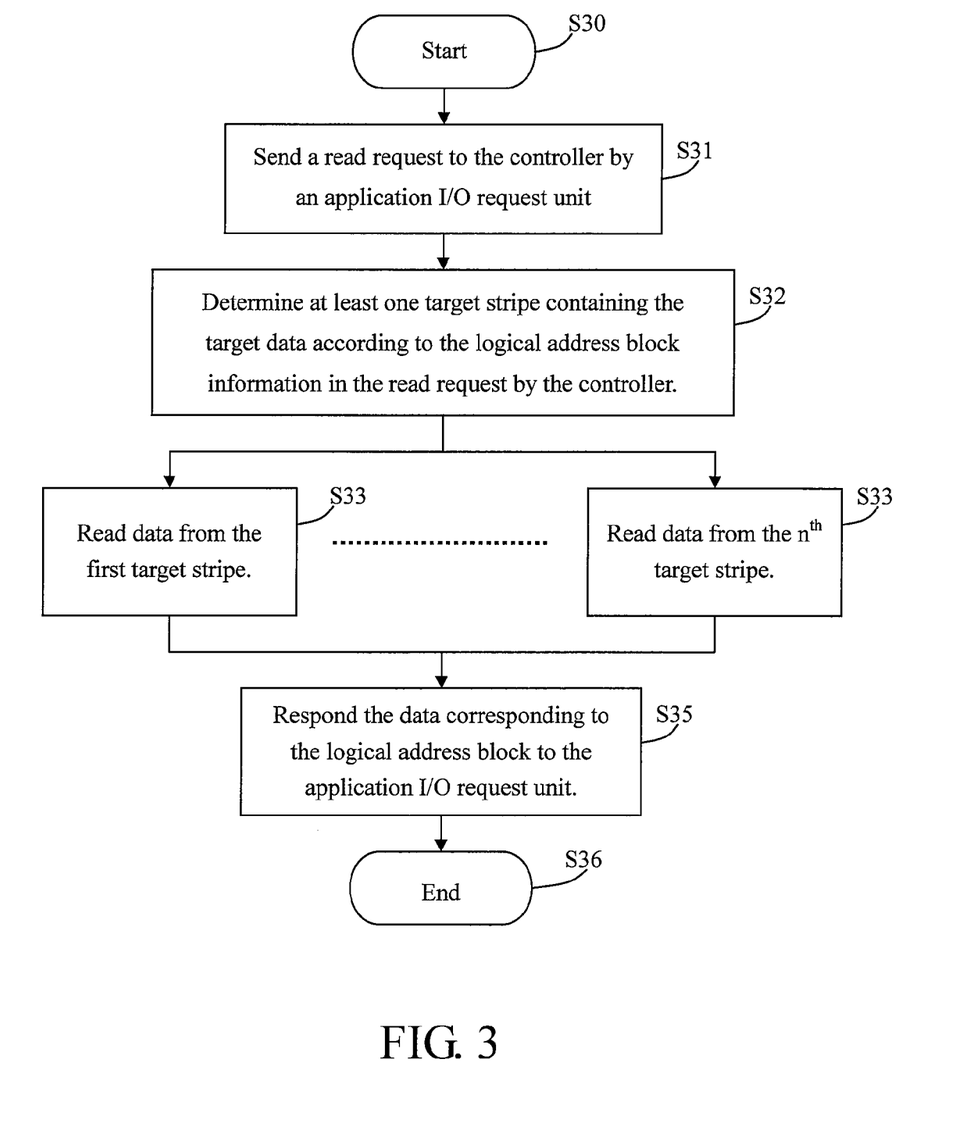
FIG. 3 is a main flowchart of a data access method according to an embodiment of the invention.

Please refer to FIG. 3, which shows a main flowchart of a data access method according to an embodiment of the invention and FIG. 1 simultaneously for the following description. When the flowchart begins (step S30), the application I/O request unit 11 sends a data read request to the controller 121 (step S31). The controller 121 analyzes the logical address block information of the data read request to determine the address for accessing the target data and the corresponding target stripe (step S32). It should be noticed that the result of analysis may indicate several data blocks storing the target data and the target data may be distributed in more than one target stripes. In such situation, the controller 121 will concurrently and separately carry out data access actions toward the target stripes (step S33). Each target stripe logically corresponds to several data blocks comprising the user data block(s) and the parity data block (s) located at a plurality of storage devices (D1, D2, D3 and D4). The data stored in any data block can be obtained by calculating the data stored in other data blocks of the same stripe.

The data access action is then performed according to the given target stripe. If there is n number of the target stripes containing the target data, the data access action will be performed on these target stripes respectively as the steps shown in FIG. 4A. When the target data corresponding to the logical address block is read successfully (or the redundant data identical to the read data is generated successfully), the target data will be responded to the application I/O request unit 11 (step S35). Finally, the flowchart comes to the end (step S36).

In step S35, irrespective of responding the successfully-read target data or the generated redundant data, both are the expected data of the logical data block corresponding to the data read request. It should be noticed that the responded data in step S35 may be the whole or just a part of the received data of the user data block(s), dependent on the logical address block of the data read request.

Figure 4A:
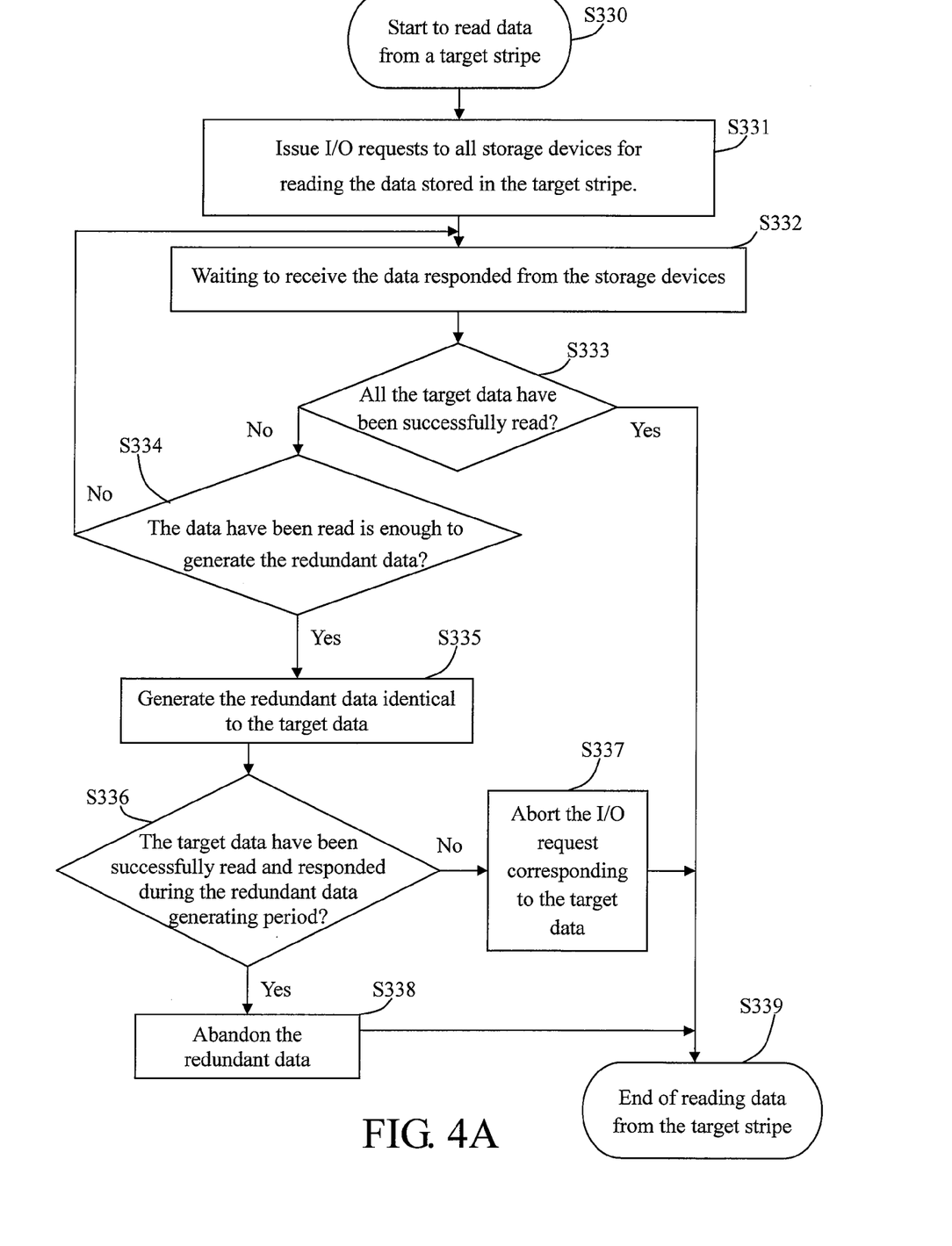
FIG. 4A and FIG. 4B are data reading flowcharts for each target stripe according to two embodiments of the invention.

Please refer to FIG. 4A. When the flowchart of accessing data on each target stripe starts (step S330), at least one to-be-read data block in each of the storage devices D1, D2, D3 and D4 is determined first according to the analyzed logical address block mapped on the target stripe. Then, the controller 121 issues a plurality of I/O requests to all storage devices D1, D2, D3 and D4 of the storage unit 122 for accessing target data and other corresponding data stored in the same stripe, respectively (step S331).

The plurality of I/O requests comprises at least one first I/O request and at least one second I/O request. The first I/O request is for accessing the target data, while the second I/O request is for accessing other data stored in the same stripe. Both the first I/O request and the second I/O request comprise the information able to command the storage devices D1, D2, D3 and D4 to access data in a physical address block. It should be noticed that the I/O requests are simultaneously issued to all storage devices D1, D2, D3 and D4 of the storage units 122 for accessing all user data and parity data stored in the target stripe (step S331).

Step S332 starts waiting to receive data responded from the storage devices D1, D2, D3 and D4 for proceeding the following determination and operations. The responded data may be responded to the first I/O request or the second I/O request. The responded data received in step S332 can be stored in a caching space for speeding up the following processes. While waiting in step S332, the controller 121 can be only waiting for the data responded from the storage devices D1, D2, D3 and D4, or in another embodiment of the invention, the controller 121 can also actively detect whether the data is successfully read or not.

If there is any data successfully read and responded to the controller 121 in the above-mentioned waiting process, the controller 121 will determine whether all the target data have been successfully read or not (step S333). If the determining result of step S333 is "No", the controller 121 will further determine whether other responded data is enough to generate the redundant data identical to the target data (step S334). If the determining result of step S334 is "Yes", it goes to step S335. Otherwise, it goes back step S332 and keeps waiting other responded data.

In step S335, the redundant data generating unit 1213 directly generates the redundant data identical to the target data without waiting for a timeout period. When the redundant data is generated successfully, it goes to step S336, determining whether the target data is successfully read and responded or not during the period of generating the redundant data. If the target data is not responded to controller 121 yet, in one embodiment of the invention the I/O request sent for reading the target data is aborted (step S337) and the redundant data is temporarily stored in a cache for replying to the application I/O request unit 11 (corresponding to step S35 in FIG. 3). If the target data has been responded to the controller 121, the redundant data will be abandoned (step S338) and the data reading process goes to the end (step S339). It needs to notice that, in step S335 of generating the redundant data, the controller 121 keeps judging whether all the target data are successfully read or not (step S333). This judging procedure will not stop even when the redundant data generating process begins.

Figure 4B:
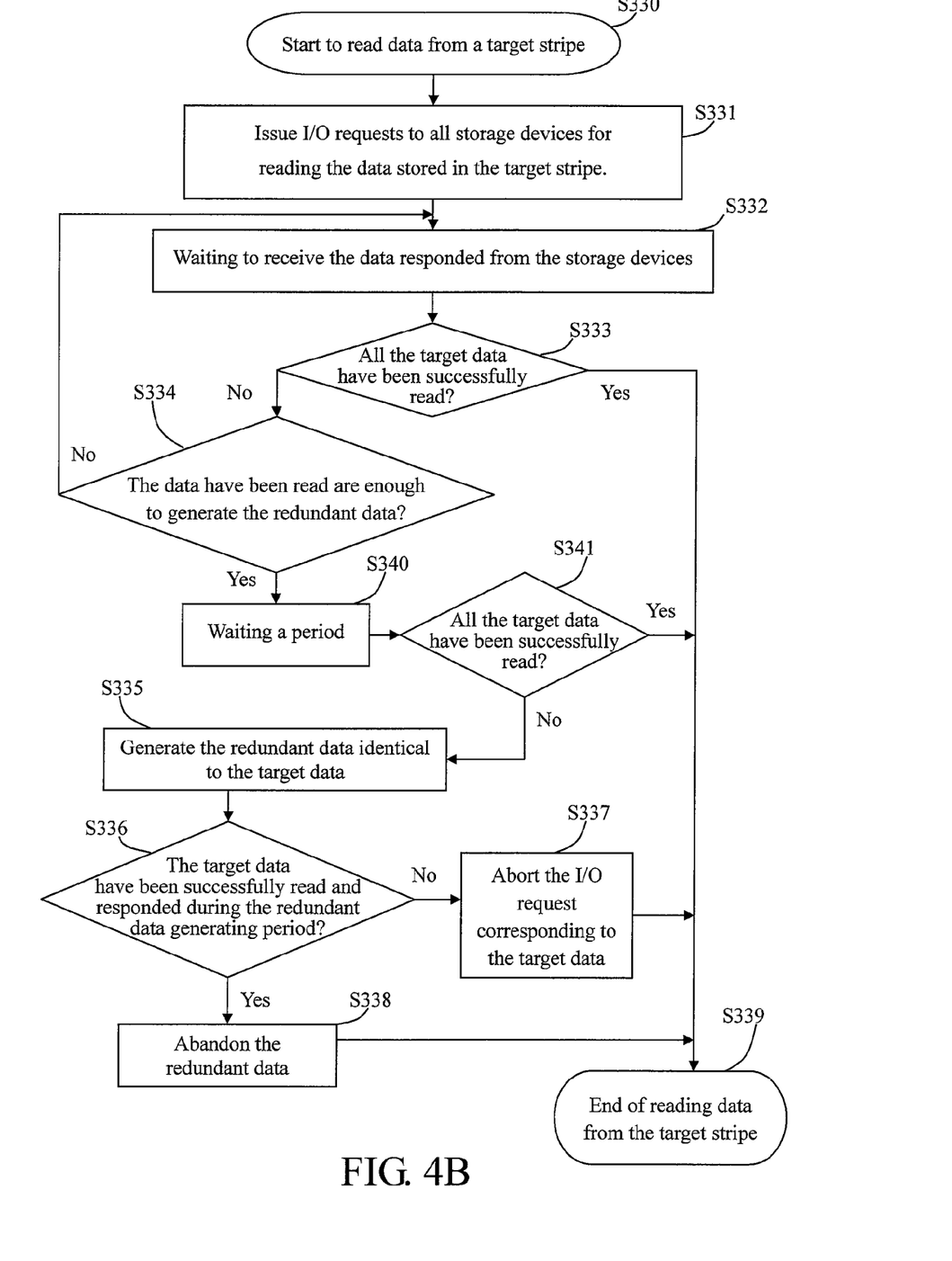

Please refer to FIG. 4B, which is another embodiment of the invention. If the determining result of step S334 is "Yes", it is further waiting a short time period (step S340), and then goes to step S341 determining whether all the target data are successfully read or not (step S341), before step S335. If the determining result of step S341 is "Yes", it goes to step S339, and otherwise, it goes to step S335. In some cases, the above-mentioned process may improve the performance of the storage subsystem. For example, in some conditions, the response of reading the target data may be slower, but within a short time period after other data all responded (e.g. 1 millisecond). Therefore, it may be more efficient to wait a short time period before directly going to step S335 to generate the redundant data.

In step S333, if the determining result of step S333 is "Yes", it means that all the target data have been successfully read. The procedure of generating the redundant data can be ignored, and the flowchart of reading data on the target stripe comes to the end (step S339).

In step S333, if all the target data corresponding to the first I/O requests are successfully read and responded but there are the second I/O requests uncompleted, one of two measures can be adopted according to practical application requirements. First, it continues to complete the second I/O request(s) and temporarily stores the read data on a cache memory. Thus, especially in a sequential read application, it allows later data read requests able to be responded quickly. Second, all the uncompleted second I/O requests are aborted for relatively reducing the amount of I/O transmission. It needs to notice that, even choosing the first measure—to continue completing the second I/O request(s), it should proceed after responding the target data (or the corresponding redundant data) to the application I/O request unit 11 and keep the process of completing the second I/O request(s) from affecting the timing of responding the target data (or the corresponding redundant data) to the application I/O request unit 11.

Figure 5:
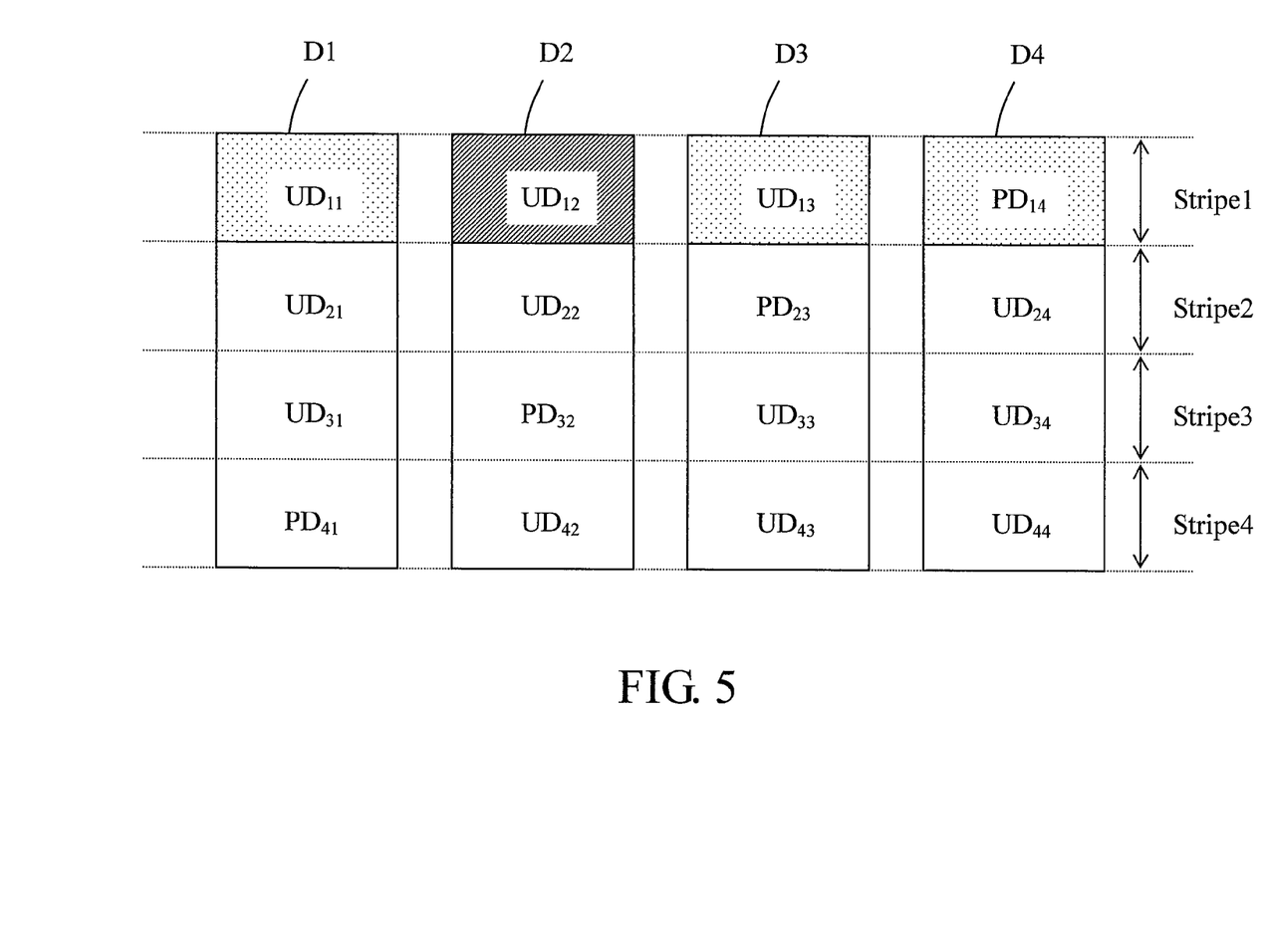
FIG. 5, FIG. 6, and FIG. 7 show schematic view of storing space of the storage devices and the corresponding logical address blocks according to the embodiments of the invention.

In order to make the invention more clear, an actual example is brought out below to explain the operation details of the above-mentioned methods. There are two possible situations in this example. Referring to FIG. 3, first in step S31 the application I/O request unit 11 sends a data read request, which contains the information of reading data from a logical address block, to the controller 121. FIG. 5 shows a schematic view of the storing space of the storage devices and its corresponding logical address blocks according to an embodiment of the invention. Assuming that the logical address block indicated in the data read request is corresponding to the user data block $UD_{12}$ drawn with oblique lines, and other data blocks located on the same stripe are drawn with dots. In step S32, stripe 1 is determined to be the target stripe according to the logical address block of the data read request. Thus, the user data block $UD_{11}$ is decided to be accessed from plural data blocks of the storage device D1; the user data block $UD_{12}$ is decided to be accessed from plural data blocks of the storage device D2; the user data block $UD_{13}$ is decided to be accessed from plural data blocks of the storage device D3; the parity data block $PD_{14}$ is decided to be accessed from plural data blocks of the storage device D4. In this example, only one target stripe contains the target data, so step S33 (equivalent to the flowchart of FIG. 4A or FIG. 4B) only needs to proceed for one target stripe.

As shown in FIG. 4A, in step S331 a first I/O request is issued to the storage device D2 for reading the target data in the user data block $UD_{12}$ and second I/O requests are issued to the storage devices D1, D3 and D4, respectively, for reading other data in the user data blocks $UD_{11}$ and $UD_{13}$ and the parity data block $PD_{14}$.

In the first situation, assuming that the data in the user data block $UD_{11}$ is returned first and then the data in the user data block $UD_{12}$. After receiving the data in the user data block $UD_{12}$, step S333 determines that the target data is already successfully read. Therefore, the flowchart of data access comes to the end (step S339), and it goes back to FIG. 3 for responding the target data read from the user data block $UD_{12}$ to the application I/O request unit 11 (step S35). Afterward, the flowchart comes to the end in step S36.

In the second situation, the storage device D2 does not respond all the while because of media errors or other factors. Therefore, while waiting in step S332, the data in the user data blocks $UD_{11}$ and $UD_{13}$ and the data in the parity data block $PD_{14}$ are returned sequentially. Thus, the flowchart then directly goes to step S335, using the received data from the user data blocks $UD_{11}$ and $UD_{13}$ and the received data from the parity data block $PD_{14}$ generates the redundant data identical to the target data stored in the user data block $UD_{12}$. Before responding the redundant data, it needs to make sure in advance whether the target data in the user data block $UD_{12}$ has been successfully read and responded or not (step S336). If not, in step S337, the I/O request for reading the target data is aborted and the generated redundant data is responded to the application I/O request unit 11 (step S35). Otherwise, in step S338, the redundant data is abandoned if the target data has been successfully read and responded while generating the redundant data.

Figure 6:
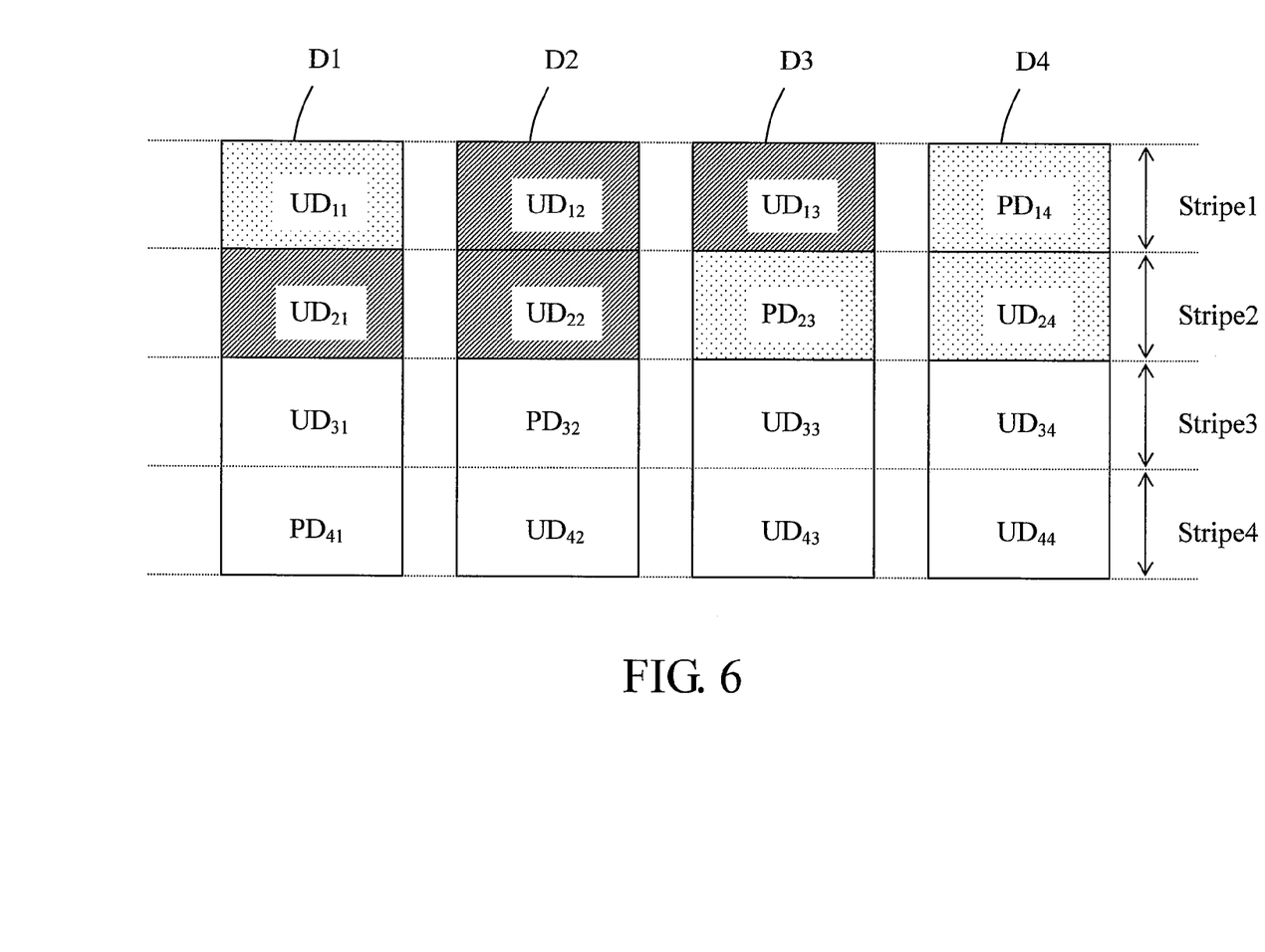

Take another example as shown in FIG. 6, which is a schematic view of another storing space of the storage devices and its corresponding logical address blocks according to an embodiment of the invention. The following description will take FIG. 4A as an example, and refer to FIG. 3 simultaneously. In step S32, assuming that the analyzed result of the data read request indicates the controller 121 to read data in the user data blocks $UD_{12}$ and $UD_{22}$ of the storage device D2, the user data block $UD_{13}$ of the storage device D3 and the user data block $UD_{21}$ of the storage device D1 drawn with oblique lines in FIG. 6. In this example, the target data is distributed on two target stripes, so step S33 (equivalent to the flowchart of FIG. 4A, or in another embodiment, equivalent to the flowchart of FIG. 4B) needs to proceed for the two target stripes respectively and simultaneously. That is to say, the controller 121 will simultaneously issue the first I/O requests and the second I/O requests to all storage devices D1, D2, D3 and D4 according to the analyzed result in step S32 for reading the target data in the user data blocks $UD_{12}$, $UD_{13}$, $UD_{21}$ and $UD_{22}$ and other related data in the data blocks $UD_{11}$, $PD_{14}$, $PD_{23}$ and $UD_{24}$, respectively. The determinations and processes after issuing the I/O requests are carried out respectively for each of the two target stripes according to the flowchart in FIG. 4A, and they are similar to the description of FIG. 5 mentioned above. Thus, the similar details will be omitted below.

There are several embodiments in the invention to respond the target data to the application I/O request unit 11 dependent on the practicable ways thereof. In an embodiment, it is to wait for all the target data (may be distributed in more than one target stripe) successfully read and then to respond them to the application I/O request unit 11 at the same time. In another embodiment, once the target data stored in the logical address block(s) of one target stripe is already read successfully (or its redundant data has been generated successfully), in step S35, the target data will be responded to the application I/O request unit 11 directly. Taking this example, when the target data in the data blocks $UD_{21}$ and $UD_{22}$ of the second stripe 2 are both read successfully (or their redundant data are generated successfully), they will be responded to the application I/O request unit 11 first. In addition to responding data by the unit of one target stripe, in another embodiment, it is also able to respond data by the unit of one data block to the application I/O request unit 11. In further another embodiment, if the data in the target data block $UD_{12}$ is not read completely yet, even though the one in the target data block $UD_{13}$ is already successfully read, it is not proper to respond the data read from the target data block $UD_{13}$ to the application I/O request unit 11 first. It needs to wait until the data in the target data block $UD_{12}$ has been read successfully and then to respond to the application I/O request unit 11.

Figure 7:
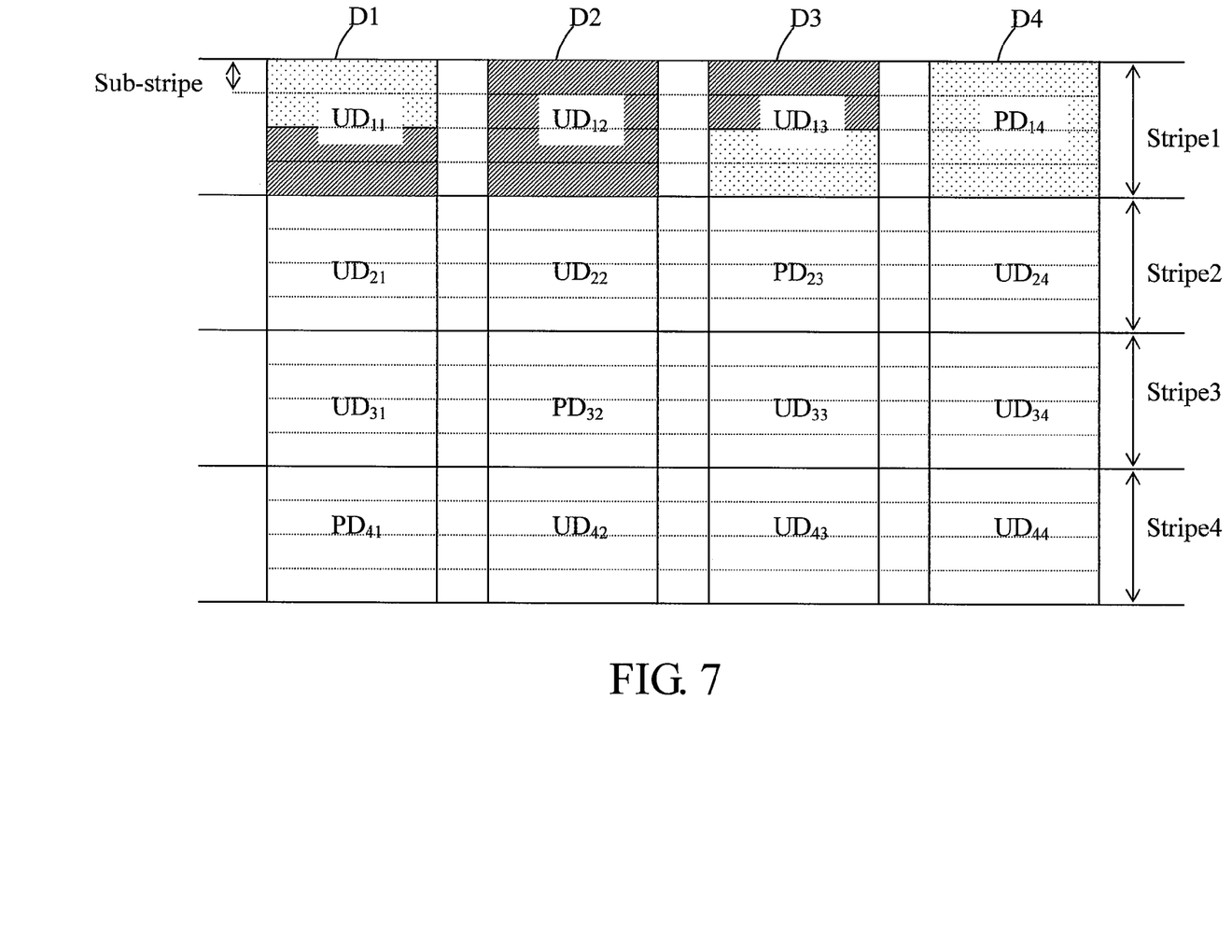

In other embodiments of the invention, with reference to FIG. 7, it can further divide each stripe into a plurality of sub-stripes and take a sub-stripe as a data access unit. As shown in FIG. 7, if it is defined that the size of each data block of one stripe is 64 KB and one stripe is equally divided into four sub-stripes, the size of each user data sub-block/parity data sub-block in the sub-stripes is 16 KB. Accordingly, the processing steps in FIG. 3 and FIG. 4A/FIG. 4B will turn into using one sub-stripe as a processing unit. For example, while reading data, after analyzing the logical address block of the data read request (corresponding to step S32 in FIG. 3), it is learned that the target data is distributed over the user data sub-blocks including the third and fourth ones of the user data block $UD_{11}$, the all four ones of the user data block $UD_{12}$, and the first and second ones of the user data block $UD_{13}$. Thus, the controller 121 will issue I/O requests to all storage devices D1, D2, D3 and D4 simultaneously and respectively for reading the target data in each of the sub-stripes. The following processes thereafter are similar to the ones mentioned in the above embodiments, but it only changes to take a sub-stripe as a processing unit. Thus, the similar details will be omitted below. For description convenience for the invention, one stripe in the invention can comprise one or more sub-stripes. When the stripe only comprises one sub-stripe, each data block only comprises one data sub-block.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data access method, performed by a controller in order to read data from a plurality of storage devices, the data access method comprising steps of:
   receiving a data read request that comprises information about a set of target data to be read from at least one logical address block;
   determining, according to the at least one logical address block, at least one target sub-stripe in which the set of target data is located, each of the at least one target sub-stripe comprising a plurality of user data sub-blocks and at least one parity data sub-block; and
   performing the following steps for each of the at least one target sub-stripe:
   issuing, by the controller, a plurality of I/O requests to the plurality of storage devices simultaneously in order to read all data in the target sub-stripe from the plurality of user data sub-blocks and from the at least one parity data sub-block, where the plurality of I/O requests comprise at least one first I/O request for reading at least one sub-block of user data included in the set of target data and comprise a plurality of second I/O requests for reading a plurality of sub-blocks of other related data except the at least one sub-block of user data included in the set of target data; wherein the other related data requested by the plurality of second I/O requests comprise at least one sub-block of parity data and at least one sub-block of user data which is not included in the set of target data;
   waiting for reading out of data from the plurality of storage devices;
   performing a first determination that determines whether or not all of the at least one sub-block of user data included in the set of target data requested by the at least one first I/O request is read out from the plurality of storage devices;
   performing, when all of the at least one sub-block of user data included in the set of target data is not read out from the plurality of storage devices, a second determination that determines whether or not data read out from the plurality of storage devices is enough to generate at least one sub-block of redundant data identical to the at least one sub-block of user data included in the set of target data that is not responded yet; and
   generating the at least one sub-block of redundant data if the second determination result determines yes; and
   performing a third determination that determines whether or not the at least one sub-block of user data included in the set of target data is already read out from the plurality of storage devices and responded during the period of generating the at least one sub-block of redundant data, and replying either the at least one sub-block of user data included in the set of target data which is read out from the plurality of storage devices or the at least one sub-block of redundant data to an application I/O request unit.

2. The data access method of claim 1, wherein the data read request is issued by an application I/O request unit.

3. The data access method of claim 2, wherein the application I/O request unit is a network computer, a mini computer, a mainframe computer, a laptop computer, a cell phone, a personal digital assistant (PDA), a digital recording device, or a digital music player.

4. The data access method of claim 1, wherein if one of the sub-blocks of user data to be read from the target sub-stripe is already stored in a caching space, the procedure to read the one of the sub-blocks of user data is omitted.

5. The data access method of claim 1, wherein if the first determination result is yes, after the at least one sub-block of user data included in the set of target data is responded to an application I/O request unit, the plurality of second I/O requests are continuously performed until completion.

6. The data access method of claim 1, after generating the at least one sub-block of redundant data identical to the at least one sub-block of user data included in the set of target data that is not responded yet, further performing a third determination that determines whether the at least one sub-block of user data included in the set of target data is already read out from the plurality of storage devices and responded or not during the period of generating the at least one sub-block of redundant data, and if the result is yes, abandoning the at least one sub-block of redundant data, and if the result is not, replying the at least one sub-block of redundant data to an application I/O request unit.

7. The data access method of claim 1, before generating the at least one sub-block of redundant data, further comprising steps of waiting a short time period and determining whether all the at least one sub-block of user data included in the set of target data are read out from the plurality of storage devices or not.

8. The data access method of claim 1, wherein data stored in the parity data block comprises backup data stored by a mirroring technique.

9. The data access method of claim 1, wherein the size of the target sub-stripe can be as large as the size of a target stripe, each the target stripe comprising a plurality of data blocks, including a plurality of user data blocks and at least one parity data block, and the plurality of I/O requests are issued in order to read data from the plurality of data blocks.

10. A storage subsystem, comprising:
    a storage unit, comprising a plurality of storage devices; and
    a controller, coupled to the storage unit and used to perform a data access method which comprises steps of:
    receiving a data read request that comprises information about a set of target data to be read from at least one logical address block;
    determining, according to the at least one logical address block, at least one target sub-stripe in which the set of target data is located, each of the at least one target sub-stripe comprising a plurality of user data sub-blocks and at least one parity data sub-block; and
    performing the following steps for each of the at least one target sub-stripe:
    issuing, by the controller, a plurality of I/O requests to the plurality of storage devices simultaneously in order to read all data in the target sub-stripe from the plurality of user data sub-blocks and from the at least one parity data sub-block, where the plurality of I/O requests comprise at least one first I/O request for reading at least one sub-block of user data included in the set of target data and comprise a plurality of second I/O requests for reading a plurality of sub-blocks of other related data except the at least one sub-block of user data included in the set of target data; wherein the other related data requested by the plurality of second I/O requests comprise at least one sub-block of parity data and at least one sub-block of user data which is not included in the set of target data;

waiting for reading out of data from the plurality of storage devices;

performing a first determination that determines whether or not all of the at least one sub-block of user data included in the set of target data requested by the at least one first I/O request is read out from the plurality of storage devices;

performing, when all of the at least one sub-block of user data included in the set of target data is not read out from the plurality of storage devices, a second determination that determines whether or not data read out from the plurality of storage devices is enough to generate at least one sub-block of redundant data identical to the at least one sub-block of user data included in the set of target data that is not responded yet; and generating the at least one sub-block of redundant data if the second determination result determines yes; and performing a third determination that determines whether or not the at least one sub-block of user data included in the set of target data is already read out from the plurality of storage devices and responded during the period of generating the at least one sub-block of redundant data, and replying either the at least one sub-block of user data included in the set of target data which is read out from the plurality of storage devices or the at least one sub-block of redundant data to an application I/O request unit.

11. The storage subsystem of claim 10, wherein one of the storage devices is a tape drive, a disk drive, a memory device, an optical storage device, or a sector of a disk drive corresponding to a single head.

12. The storage subsystem of claim 10, wherein one of the storage devices is a fibre channel disk drive, a SCSI disk drive, a serial-attached SCSI (SAS) disk drive, a serial ATA (SATA) disk drive, or a parallel ATA (PATA or IDE) disk drive.

13. The storage subsystem of claim 10, wherein the controller is a RAID controller.

14. The storage subsystem of claim 10, wherein the controller and the storage unit are coupled by a fibre channel interface, a SCSI interface, a serial-attached SCSI (SAS) interface, a serial ATA (SATA) interface, or a parallel ATA (PATA or IDE) interface.

15. The storage subsystem of claim 10, wherein the data read request is issued from an application I/O request unit.

16. The storage subsystem of claim 15, wherein the application I/O request unit is a network computer, a mini computer, a mainframe computer, a laptop computer, a cell phone, a personal digital assistant (PDA), a digital recording device, or a digital music player.

17. The storage subsystem of claim 10, wherein if one of the sub-blocks of user data to be read from the target sub-stripe is already stored in a caching space, the procedure to read the one of the sub-blocks of user data is omitted.

18. The storage subsystem of claim 10, wherein if the first determination result is yes, after the at least one sub-block of user data included in the set of target data is responded to an application I/O request unit, the plurality of second I/O requests are continuously performed until completion.

19. The storage subsystem of claim 10, after generating the at least one sub-block of redundant data identical to the at least one sub-block of user data included in the set of target data that is not responded yet, further performing a third determination that determines whether the at least one sub-block of user data included in the set of target data is already read out from the plurality of storage devices and responded or not during the period of generating the at least one sub-block of redundant data, if yes, abandoning the at least one sub-block of redundant data, if not, replying the at least one sub-block of redundant data to an application I/O request unit.

20. The storage subsystem of claim 10, before generating the at least one sub-block of redundant data, further comprising the steps of waiting a short time period and determining whether all the at least one sub-block of user data included in the set of target data are read out from the plurality of storage devices or not.

21. The storage subsystem of claim 10, wherein data stored in the parity data block comprising backup data stored by a mirroring technique.

22. The storage subsystem of claim 10, wherein the size of the target sub-stripe can be as large as the size of a target stripe, each the target stripe comprising a plurality of data blocks, including a plurality of user data blocks and at least one parity data block, and the plurality of I/O requests are issued in order to read data from the plurality of data blocks.

* * * * *